United States Patent
Hwang et al.

(10) Patent No.: US 9,549,352 B2
(45) Date of Patent: Jan. 17, 2017

(54) USER EQUIPMENT MOBILITY INFORMATION

(71) Applicant: Nokia Technologies Oy, Espoo (FI)

(72) Inventors: Woonhee Hwang, Espoo (FI); Jarkko Koskela, Oulu (FI); Lars Dalsgaard, Espoo (FI); Ilkka Keskitalo, Oulu (FI); Johanna Pekonen, Espoo (FI); Mikko Saily, Sipoo (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/396,167

(22) PCT Filed: May 6, 2013

(86) PCT No.: PCT/FI2013/050489
§ 371 (c)(1),
(2) Date: Oct. 22, 2014

(87) PCT Pub. No.: WO2013/167800
PCT Pub. Date: Nov. 14, 2013

(65) Prior Publication Data
US 2015/0119044 A1    Apr. 30, 2015

Related U.S. Application Data (60) Provisional application No. 61/643,816, filed on May 7, 2012.

(51) Int. Cl.
*H04W 36/00* (2009.01)
*H04W 36/32* (2009.01)
(Continued)

(52) U.S. Cl.
CPC ........... *H04W 36/0083* (2013.01); *H04W 8/08* (2013.01); *H04W 36/32* (2013.01); *H04W 76/046* (2013.01); *H04W 76/06* (2013.01)

(58) Field of Classification Search
CPC .................. H04W 36/0083; H04W 36/245
(Continued)

(56) References Cited

U.S. PATENT DOCUMENTS 9,020,481 B1 * 4/2015 Monin .............. H04W 52/0212
370/338
2011/0086635 A1    4/2011 Grob-Lipski
(Continued)

FOREIGN PATENT DOCUMENTS

EP        2385725 A1    11/2011
WO    2011123744 A1    10/2011

OTHER PUBLICATIONS

International Search Report and Written Opinion received for corresponding Patent Cooperation Treaty Application No. PCT/FI2013/050489, dated Aug. 16, 2013, 13 pages.
(Continued)

*Primary Examiner* — Kevin Kim
(74) *Attorney, Agent, or Firm* — Mintz Levin Cohn Ferris Glovsky and Popeo, P.C.

(57) ABSTRACT

Methods and apparatus, including computer program products, are provided for providing mobility information to the network. In one aspect there is provided a method. The method may include determining mobility information representative of a mobility of a user equipment during an idle state and a connected state of the user equipment (204); and sending, when in a connected mode, mobility information to a node of a wireless network (210). Related apparatus, systems, methods, and articles are also described.

20 Claims, 4 Drawing Sheets

(51) Int. Cl.
*H04W 8/08* (2009.01)
*H04W 76/04* (2009.01)
*H04W 76/06* (2009.01)

(58) Field of Classification Search
USPC ................................. 455/441, 437, 443, 444
See application file for complete search history.

(56) References Cited

U.S. PATENT DOCUMENTS

| | | | | |
|---|---|---|---|---|
| 2013/0258875 A1* | 10/2013 | Siomina | ................ | H04W 36/30 370/252 |
| 2015/0118993 A1* | 4/2015 | Rune | .................... | H04W 12/08 455/410 |

OTHER PUBLICATIONS

Mobitlity state reporting. 3GPP Draft; R2-121718 Mobility state reporting; Potevio; 3GPP TSG-RAN WG2 Meeting #77bis, Jeju, Korea, Mar. 26-30, 2012; pp. 1-2. Downloaded by EPO on Mar. 20, 2012; [retrieved on Aug. 13, 2013]; EPOQUENET NPL XP050606419 chapters 2.1-2.2.

Summary of email discussion [77#33] LTE: Mobility State Estimation Enhancements. 3GPP Draft; R2-121850_SummaryOfEmailDisc77_33_revised; Renesas Mobile Europe Ltd; 3GPP TSG-RAN WG2 Meeting #77bis, Jeju, Korea, Mar. 26-30, 2012; pp. 1-24. Downloaded by EPO on Mar. 27, 2012 [retrieved on Aug. 13, 2013]; EPOQUENET NPL XP050606524 chapter 3.3; especially Potevio's comments.

UE assistance for mobility. 3GPP Draft; R2-122516_UE assistance for mobility; Nokia Corporation; Nokia Siemens Networks; 3GPP TSG-RAN WG2 Meeting #78, Prague, Czech Republic, May 21-25, 2012; pp. 1-4. Downloaded by EPO on May 15, 2012; [retrieved on Aug. 14, 2013]; EPOQUENET NPL XP050607301, the whole document.

Interdigital. "UE mobility state reporting". 3GPP Draft; R2-081760. 3GPP TSG-RAN WG2#61. Shenzhen, China. Mar.-Apr. 2008.

Samsung. "Measurement report on UE mobility state". 3GPP Draft; R2-080819. 3GPP TSG-RAN WG2#61. Sorrento, Italy. Feb. 2008.

* cited by examiner

USER EQUIPMENT MOBILITY INFORMATION

RELATED APPLICATION

This application was originally filed as Patent Cooperation Treaty Application No. PCT/FI2013/050489 filed May 6, 2013 which claims priority benefit to United States Provisional Patent Application No. 61/643,816, filed May 7, 2012.

The subject matter described herein relates to wireless communications.

BACKGROUND

A user equipment may determine its degree of mobility. The degree of mobility for a given user equipment may be useful to the network to allow adjusting various values associated with, for example, handover target cell selection, discontinuous reception (DRX) configuration, changing user equipment to an idle state, and the like. For example, a user equipment that is highly mobile may move through a cell at a high rate of speed. This high mobility may impact the service provided to the user equipment with respect to the handover (when the user equipment is in a connected state). To illustrate further with an example, if the network decides to use a target handover cell for a highly mobile user equipment and use the same cell for a less mobile user equipment, the network may command a handover to a cell which no longer serves the highly mobile user equipment. Indeed, these concerns are only exacerbated in so-called heterogeneous networks that include macro cells, picocells, femtocells, or a combination thereof.

SUMMARY

Methods and apparatus, including computer program products, are provided for mobility information.

In one aspect there is provided a method. The method may include determining mobility information representative of a mobility of a user equipment during an idle state and a connected state of the user equipment; and sending, when in a connected mode, mobility information to a node of a wireless network.

In some exemplary embodiments, one of more variations may be made as well as described in the detailed description below and/or as described in the following features. The mobility information may include information representative of a quantity of consecutive state transitions from an idle mode to the connected mode experienced by the user equipment in a current cell. The mobility information may include information representative of a quantity of connection releases by the user equipment in a current cell. The mobility information may include information representative of a quantity of mobility state transitions occurring in a current cell during a time period. The mobility information may include information representative of a count of state transitions in a plurality of cells. The mobility information may include information representative of a traffic pattern at the user equipment.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Like labels are used to refer to same or similar items in the drawings.

DETAILED DESCRIPTION

To optimize network signalling while judiciously consuming user equipment power, the user equipment may provide information to a network to assist the network in estimating the mobility of the user equipment. This mobility information provided by the user equipment to the network may include information representation of whether the user equipment is mobile and information representative of the degree to which the user equipment is mobile.

Depending on the mobility activity (e.g., amount of cell changes observed over a given time) of the user equipment, a user equipment in a connected mode to the network can generate a relatively large volume of handover signalling with the network, which may create a significant network signalling load. Moreover, in a heterogeneous network environment (e.g., a HetNet including overlapping small cells and macrocells), the user equipment's mobility including its mobility pattern, history, and the like may impact the network's decision with respect to the selection of which target cell to use for a handover (and the corresponding wireless access point serving that cell) and the corresponding parameters for that target cell/wireless access point after the handover. By having the user equipment provide mobility information (which is representative of the mobility of the user equipment) to the network, the network's configuration of the user equipment may, in some exemplary implementations, be enhanced, when compared to the network estimating the user equipment's mobility based on previous, historical network information (e.g., a list of previous cells and cell types, how long UE stayed in the previous cells) determined from a connected state user equipment, and the like.

For example, when the data traffic profile of a user equipment is bursty, the user equipment may receive (and/or send) a large number of bursts of data for a short period of time followed by a period with relatively less data transmission. During this less active traffic period, the network has the option to at least choose to keep the user equipment in a connected mode or release the connection, changing thus the user equipment's state to an idle mode. The option selected by the network may depend on input information (e.g., information concerning the user equipment's mobility). If the network determines (e.g., selects) the option of changing the user equipment to an idle mode, the user equipment may remain in an idle mode for a relatively long period of time, when compared to the time spent in connected mode. While in an idle mode, the user equipment may not be configured to provide any information to the network to assist the network in mobility estimation. Having up-to-date mobility information at the network may allow the network to more accurately determine the mobility of the user equipment, and, in some instances, allow the network to, based on up-to-date mobility information, change a greater quantity of user equipment (e.g., fast moving user equipment) to an idle mode, which may save on signalling load between the network and one or more user equipment.

Before providing additional examples regarding the mobility information, the following provides an example of a system framework in which some of the exemplary embodiments described herein may be implemented.

Figure 1:
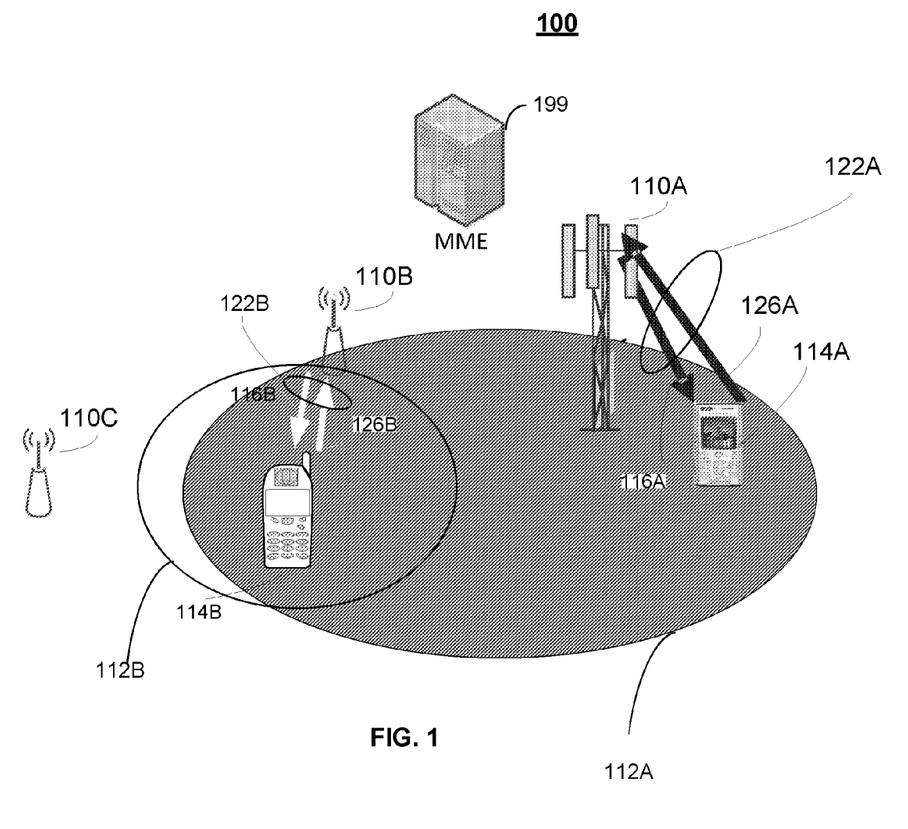
FIG. 1 depicts an example of a system configured to allow a user equipment to provide mobility information to the network, in accordance with some exemplary embodiments.

FIG. 1 depicts a system 100 according to some exemplary embodiments. System 100 may include one or more user equipment, such as user equipment 114A-B, one or more access points, such as base stations 110A and 110C and wireless access point 110B. In some exemplary embodiments, the wireless access point 110B is configured to include at least one low energy transceiver, such as Bluetooth low energy (BT-LE), and user equipment 114B is also configured to include at least one low energy transceiver, such as BT-LE. The base station 110A may serve a cell, such as macrocell 112A, and wireless access point 110B may serve a small cell, such as a picocell or a femtocell 112B.

Although FIG. 1 depicts a specific quantity and configuration of base stations, cells, wireless access points, and user equipment, other quantities and configurations may be implemented as well.

Moreover, base stations 110A and 110C and/or wireless access points 110B may have wired and/or wireless backhaul links to other network nodes, such as a mobility management entity 199, other base stations, a radio network controller, a core network, a serving gateway, and the like.

In some exemplary embodiments, user equipment 114A-B may be implemented as a user equipment and/or a stationary device. The user equipment 114A-B are often referred to as, for example, mobile stations, mobile units, subscriber stations, wireless terminals, tablets, smart phones, or the like. A user equipment may be implemented as, for example, a wireless handheld device, a wireless plug-in accessory, or the like. In some exemplary embodiments, user equipment may include a processor, a computer-readable storage medium (e.g., memory, storage, and the like), a radio access mechanism, and/or a user interface. For example, the user equipment may take the form of a wireless telephone, a computer with a wireless connection to a network, or the like.

In some exemplary embodiments, the user equipment 114A-B may be implemented as multi-mode user devices configured to operate using a plurality of radio access technologies. For example, user equipment 114B may be configured to operate using a plurality of radio access technologies including one or more of the following: Long Term Evolution (LTE), wireless local area network (WLAN) technology, such as 802.11 WiFi and the like, Bluetooth, Bluetooth low energy (BT-LE), and any other radio access technologies. Moreover, the user equipment 114B may be configured to have established connections to access points using a plurality of the radio access technologies.

The base station 110A may, in some exemplary embodiments, be implemented as an evolved Node B (eNB) type base station, although other types of radio access points may be implemented as well. When the evolved Node B (eNB) type base station is used, base station 110A may be configured in accordance with standards, including the Long Term Evolution (LTE) standards, such as 3GPP TS 36.201, Evolved Universal Terrestrial Radio Access (E-UTRA); Long Term Evolution (LTE) physical layer; General description, 3GPP TS 36.211, Evolved Universal Terrestrial Radio Access (E-UTRA); Physical channels and modulation, 3GPP TS 36.212, Evolved Universal Terrestrial Radio Access (E-UTRA); Multiplexing and channel coding, 3GPP TS 36.213, Evolved Universal Terrestrial Radio Access (E-UTRA); Physical layer procedures, 3GPP TS 36.214, Evolved Universal Terrestrial Radio Access (E-UTRA); Physical layer—Measurements, and any subsequent additions or revisions to these and other 3GPP series of standards (collectively referred to as LTE standards). The base station 110A may also be configured to serve macrocell 112A using a WLAN technology, such as WiFi (e.g., the IEEE 802.11 series of standards), and any other radio access technology capable of serving macrocell 112A.

In some exemplary embodiments, the system 100 may include access links, such as links 122A-B. The access links 122A may include a downlink 116A for transmitting to the user equipment 114A and an uplink 126A for transmitting from user equipment 114A to the base station 110A. The downlink 116A may comprise a modulated radio frequency carrying information, such as user data, radio resource control (RRC) messages, location information, and the like, to the user equipment 114A, and the uplink 126A may comprise a modulated radio frequency carrying information, such as user data, RRC messages, location information, measurement reports associated with handovers, and the like, from the user equipment 114A to base station 110A. Access links 122B may include downlink 116B for transmitting from the wireless access point 110B to user equipment 114B, and uplink 126B for transmitting from user equipment 114B to the wireless access point 110B. Although FIG. 1 depicts access links 122B between user equipment 114B and wireless access point 110B, user equipment 114B may have access links to other devices, such as base station 110A, base station 110B, and the like.

The downlink 116A and uplinks 126A may, in some exemplary embodiments, each represent a radio frequency (RF) signal. The RF signal may, as noted above, include data, such as voice, video, images, Internet Protocol (IP) packets, control information, and any other type of information and/or messages. For example, when LTE is used, the RF as signal may use OFDMA. OFDMA is a multi-user version of orthogonal frequency division multiplexing (OFDM). In OFDMA, multiple access is achieved by assigning, to individual users, groups of subcarriers (also referred to as subchannels or tones). The subcarriers are modulated using BPSK (binary phase shift keying), QPSK (quadrature phase shift keying), or QAM (quadrature amplitude modulation), and carry symbols (also referred to as OFDMA symbols) including data coded using a forward error-correction code. The subject matter described herein is not limited to application to OFDMA systems, LTE, LTE-Advanced, or to the noted standards, specifications, and/or technologies. Furthermore, the downlink 116B and uplink 126B may be configured using standards and/or technologies similar to those noted with respect to downlink 116A and uplink 126A, although downlink 116B and uplink 126B may use a different standards or technologies as well, such as WiFi, WiBro, BT-LE, and/or another other wireless technology. In addition, each access link may be unidirectional or bidirectional.

The wireless access point 110B may, in some exemplary embodiments, be implemented to serve a small cell, such as femtocell 112B. Moreover, wireless access point 110B may be configured to operate with a plurality of radio access technologies including LTE, WiFi, BT-LE, and/or any other wireless local area network standards. In some exemplary embodiments, the wireless access point 110B may be implemented as a home evolved node B (HeNB) base station serving femtocell 112B, which covers a structure or a predefined area, such as a home, an office building, and the like, although wireless access point 110B may also be implemented as a cellular base station as well.

In some exemplary embodiments, the user equipment may provide mobility information to the network. Moreover, the mobility information may include one or more of the following: information representative of how many state transitions from an idle mode to a connected mode have been experienced by the user equipment in a current cell (e.g., currently serving cell); information representative of how many connection releases (e.g., radio resource control (RRC) connection releases) the user equipment experienced in a current cell; information representative of how many connection setups (e.g., RRC connections) the user equipment experienced in a current cell; information representative of how many state transitions have occurred in a current cell during a given time period; information representative of a count of the state transitions in a plurality of cells; information representative of the traffic patterns experienced at the user equipment; and information representative of how long a user equipment stayed in one or more previous cells (referred to herein as "time for staying"). The above-noted time period may be fixed or configurable. For example, the time period may be configured as a time since the user equipment entered the cell, although other times may be used as well. The phrase current cell refers as to a cell currently serving a user equipment, while the phrase target cell refers to a cell which may be the subsequent cell serving the user equipment after a handover.

In some exemplary embodiments, the mobility information may include, as noted above, information representative of a count of the state transitions in a plurality of cells. When this is the case, this count information may include a quantity of state transitions (e.g., idle to connected) in a current cell and one or more previous cells serving the user equipment. The number of previous cells included in the count information may be fixed or configurable. Further, this count information may be implemented as a count of state transitions in multiple serving cells over a given period of time.

The mobility information provided by the user equipment to the network may, in some exemplary embodiments, assist the network to determine what value to use to set a RRC release timer defining when the user equipment should be moved to an idle mode after an actual data transfer to the user equipment has ceased.

To further illustrate time for staying information, the following example is provided. If a user equipment visits cells A, B, and C before being served by cell D and the user equipment makes a connection (e.g., RRC connection) in cell D, the user equipment may report to the network that the user equipment stayed in cell A for 15 seconds, stayed in cell B for 30 seconds, and stayed in cell C for 40 seconds. As such, the network may estimate that the user equipment is moving. In some exemplary embodiments, the number of cells may be predetermined (or the duration may be predetermined/fixed). For example, the user equipment may report to the network which cells (e.g., by cell identifier) the user equipment visited and the time in each cell ("time for staying in" the cell) for a given duration, such as the identity of the visited cell and time for staying for the previous 5 minutes before making a connection, e.g., an RRC connection.

In some exemplary embodiments, the user equipment, such as user equipment 114B, may collect information regarding its idle and connected modes, and report as mobility information the collected information to the network, such as base station 110A, wireless access point 110B, and/or any other node in the network. Moreover, this mobility information may be reported, when the user equipment changes states from an idle mode to a connected mode with the network. At this point, the network may have up-to-date mobility information after the state transition from idle to connected modes.

In some exemplary embodiments, the network may signal the user equipment to provide mobility information. For example, the network may broadcast an indication to one or more user equipment to send mobility information to the base station, when in a connected mode. While in some exemplary embodiments, the network may indicate the need for as mobility information in dedicated signalling messages, such as during an RRC connection setup procedure or during the RRC Connection reconfiguration.

In some exemplary embodiments, the mobility information may include, as noted above, information representative of how many state transitions from an idle mode to a connected mode are experienced by a user equipment while in a current cell. When this is the case, the network may provide a time period, such as a time, during which the state transition happened. For example, the user equipment may provide the network with a state transition value representative of the quantity of state transitions while the user equipment is in the current cell. Moreover, the network may indicate to the user equipment configuration information, such as the number of cells that should be included in the state transition value (e.g., the counting of state transitions).

In some exemplary embodiments, the mobility information may include, as noted above, information representative a cell ID and a time for staying. When this is the case, the network may configure a user equipment with a quantity of cells that should be included in the report (which may also include an identifier for the cell). Alternatively, or in addition, the number of cells may be fixed by the network, rather than configurable. The cell ID may be implemented as a physical cell information element (or, e.g., a primary scrambling code in case of UMTS and the like for other systems) and a global cell identification.

In some exemplary embodiments, the mobility information may also include, as noted above, information representative of the traffic patterns experienced at the user equipment. For example, traffic pattern information may include a time value representative of times between traffic bursts received at the user equipment. In some exemplary implementations, this traffic pattern information combined with other information, such as the number of state transitions, may enable the network to make a more accurate estimate about the mobility of the user equipment, which may eliminate the impact of traffic characteristics when/if the connection is released between traffic bursts.

In some exemplary embodiments, a time value indicative of when a user equipment is released to idle can be stored. When user equipment comes back to RRC connected, the network can detect the time (and determine how long the user equipment has been in idle) and initialize/continue from a previous mobility state estimated by the network. The network may also consider this mobility state estimate state transition data unreliable if such data is deemed stale based on the time value.

In some exemplary embodiments, there may be little, or no, need to wait for initial mobility events to define the mobility of the user equipment, when the network has up-to-date user equipment mobility information provided promptly after the state transition from an idle mode to a connected mode.

Figure 2:
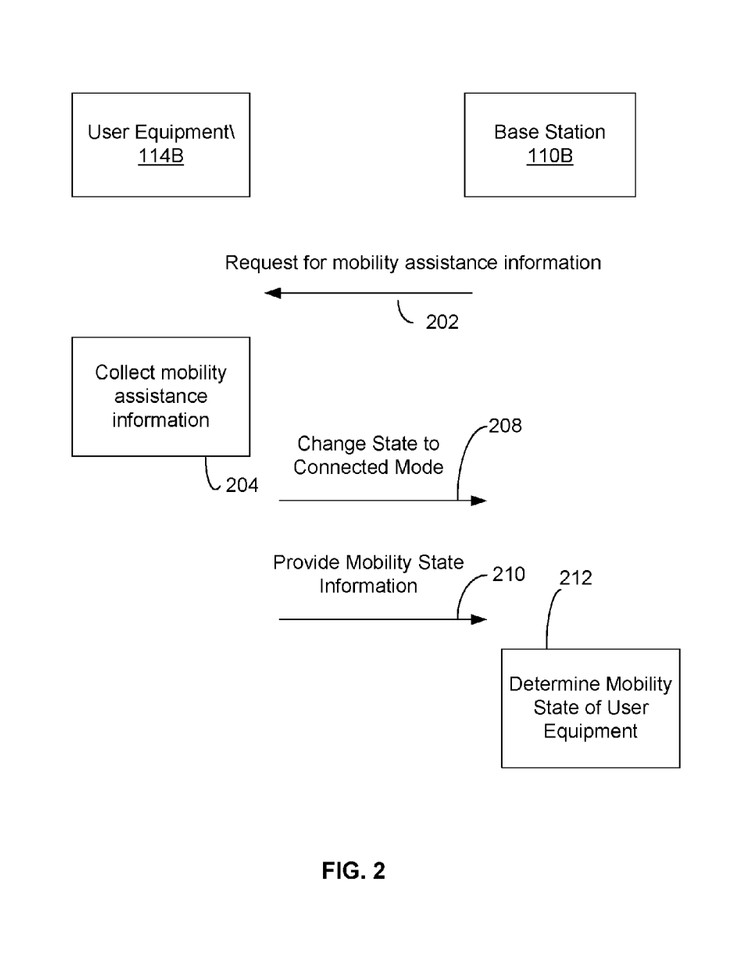
FIG. 2 depicts an example of a process configured to allow a user equipment to provide mobility information to the network, in accordance with some exemplary embodiments.

FIG. 2 depicts an example of a process 200 in which a user equipment provides mobility information to a network, in accordance with some exemplary embodiments.

At 202, the network, such as base station 110B, may send a request to one or more user equipment, such as user equipment 114B, to send mobility information to the network, in accordance with some exemplary embodiments. For example, the network may, as noted above, send the request as a broadcast to one or more user equipment and/or send the request as part of dedicated signalling. In some exemplary embodiments, when the request is broadcast to one or more user equipment, the request may be broadcast before a connection, such as a RRC connection, is made to the network (although the connection may be made during, or after, the RRC connection setup process).

At 204, the user equipment may determine mobility information, in accordance with some exemplary embodiments. For example, the user equipment may collect one or more of the following information: information representative of how many state transitions from an idle mode to a connected mode have been experience by the user equipment in a current cell (e.g., currently serving cell); information representative of how many consecutive connection releases (e.g., radio resource control (RRC) connection releases) the user equipment experienced in a current cell; information representative of how many consecutive connection setups (e.g., RRC connections) the user equipment experienced in a current cell; information representative of how many state transitions have occurred in a current cell during a given time period; information representative of a count of the state transitions in a plurality of cells; information representative of the traffic patterns (e.g., an estimate of the burst interval corresponding to the state transitions) experienced at the user equipment; and information representative of how long a user equipment stayed in one or more visited cells ("time for staying"). Moreover, this mobility information may be collected regardless of whether the user equipment is in connected or an idle state.

At 208, the user equipment may change state from an idle mode to a connected mode, in accordance with some exemplary embodiments. For example, when there is traffic to send to, or receive from, the network, the user equipment may transition from an idle mode to a connected mode.

When this change occurs, the user equipment may then provide, at 210, mobility information determined in 204, in accordance with some exemplary embodiments. For example, the user equipment may provide the mobility information in a message and/or as report sent via an uplink to the network. Furthermore, if the user equipment provides the mobility information to the network, when it enters the connected state (or soon thereafter), the network will have up-to-date mobility information.

At 212, the network may determine the mobility information of the user equipment based on the information received at 210, in accordance with some exemplary embodiments. The network may determine a target cell (and serving base station or wireless access point) based on the determined mobility. For example, the network may determine that a fast moving user equipment 114B should not be handed over to a small cell 112B, but rather another cell (or serving access point 110C) or a macrocell 112A (or base station 110A) to avoid a handover to a cell which may no longer be appropriate given the mobility of the user equipment (e.g., the user equipment is likely to be outside the serving area 112B given its mobility). Moreover, the network may determine whether the user equipment should transition to an idle mode based on the mobility information, when the data connection is not actively being used.

Figure 3:
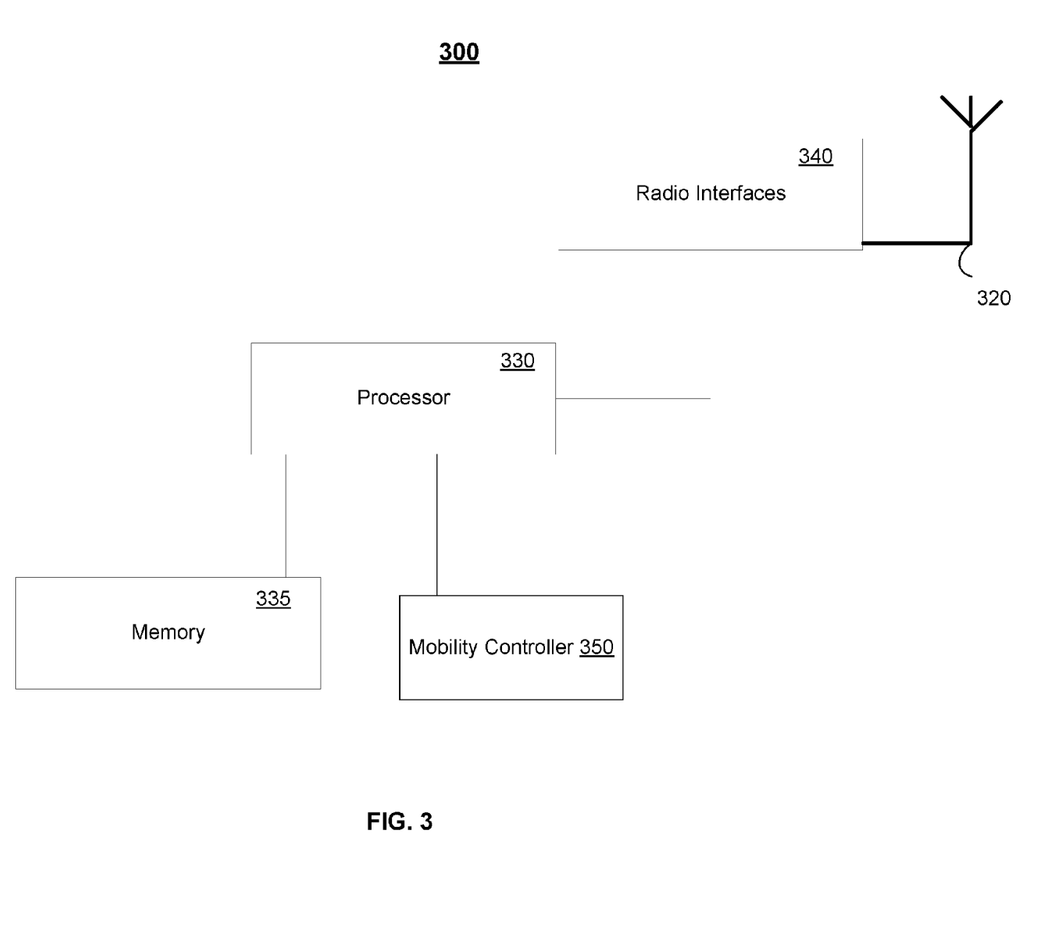
FIG. 3 depicts an example of an access point, in accordance with some exemplary embodiments.

FIG. 3 depicts an example implementation of an access point 300, which may be implemented at device 110A-C. The access point may include one or more antennas 320 configured to transmit via a downlink and configured to receive uplinks via the antenna(s) 320. The access point may further include a plurality of radio interfaces 340 coupled to the antenna 320. The radio interfaces may correspond to a plurality of radio access technologies including one or more of LTE, WLAN, Bluetooth, BTLE, NFC, RFID, UWB, ZigBee, and the like. The access point may further include a processor 330 for controlling the access point 300 and for accessing and executing program code stored in memory 335. The radio interface 340 may further include other components, such as filters, converters (e.g., digital-to-analog converters and the like), mappers, a Fast Fourier Transform (FFT) module, and the like, to generate symbols for a transmission via one or more downlinks and to receive symbols (e.g., via an uplink). The access point 300 may include a mobility controller 350 for receiving the mobility information from user equipment and for determining the mobility of the user equipment. In some implementations, mobility controller 350 may perform one or more of the operations described herein with respect to the network (e.g., devices 110A-B and the like).

Figure 4:
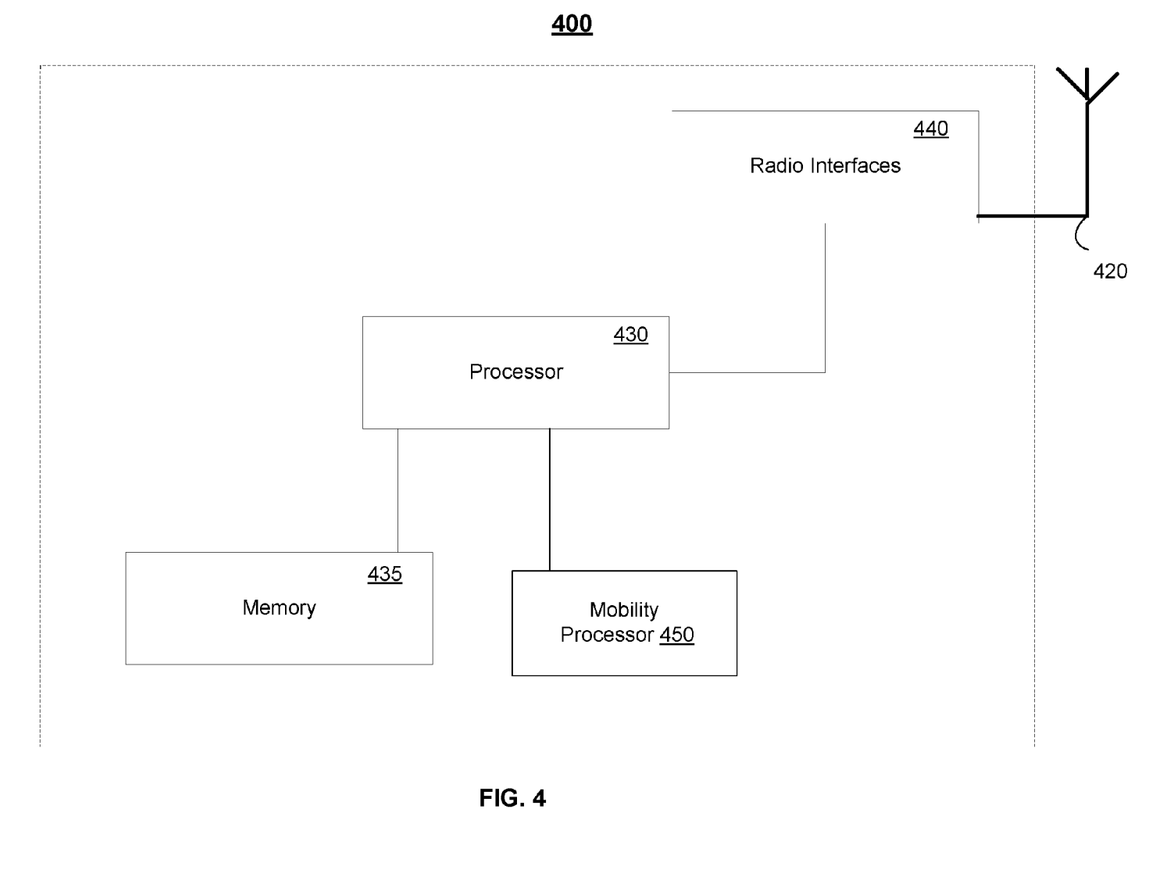
FIG. 4 depicts an example of a radio, in accordance with some exemplary embodiments.

FIG. 4 depicts a block diagram of a radio, such as a user equipment 400. The user equipment 400 may include an antenna 420 for receiving a downlink and transmitting via an uplink. The user equipment 400 may also include a plurality of radio interfaces 440 coupled to the antenna 420. The radio interfaces may correspond to a plurality of radio access technologies including one or more of LTE, WLAN, Bluetooth, BTLE, NFC, RFID, UWB, ZigBee, and the like. The radio interfaces 440 may include other components, such as filters, converters (e.g., digital-to-analog converters and the like), symbol demappers, as signal shaping components, an Inverse Fast Fourier Transform (IFFT) module, and the like, to process symbols, such as OFDMA symbols, carried by a downlink or an uplink. The user equipment 400 may further include at least one processor, such as processor 430, for controlling user equipment 400 and for accessing and executing program code stored in memory 435. The user equipment may include a mobility processor 450. In some exemplary embodiments, the mobility processor 450 may perform one or more of the operations described herein with respect to user equipment.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, computer program code, or code) include machine instructions for a programmable processor, and may be implemented in a high-level procedural and/or object-oriented programming language, and/or in assembly/machine language. As used herein, the term "machine-readable medium" refers to any computer program product, computer-readable medium, computer-readable storage medium, apparatus and/or device (e.g., magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

What is claimed:

1. A method comprising:
   determining, by a user equipment, mobility information representative of a mobility of the user equipment during an idle state and a connected state of the user equipment; and
   sending, by the user equipment, the mobility information to a node of a wireless network, wherein the mobility information comprises a history of at least one first cell visited by the user equipment and information regarding the user equipment staying outside of at least one second cell.

2. A method comprising:
   determining mobility information representative of a mobility of a user equipment during an idle state and a connected state of the user equipment; and
   sending the mobility information to a node of a wireless network, wherein the mobility information comprises a history of one or more cells visited by the user equipment, and wherein the history includes information representative of a quantity of consecutive state transitions from an idle mode to a connected mode experienced by the user equipment in a current cell.

3. A method comprising:
   determining mobility information representative of a mobility of a user equipment during an idle state and a connected state of the user equipment; and
   sending the mobility information to a node of a wireless network, wherein the mobility information comprises a history of one or more cells visited by the user equipment, and wherein the history includes information representative of a quantity of connection releases by the user equipment in a current cell.

4. The method as in claim 1, wherein sending the mobility information further comprises sending the mobility information when the user equipment is in a connected mode or when it enters the connected state.

5. The method as in claim 1, wherein the history includes time of staying in the at least one first cell.

6. The method as in claims 1, wherein the history includes cell identifiers of the at least one first cell.

7. The method as in claim 1, wherein the cell identifiers of the at least one first cell are in the form of physical cell identifier or cell global identifier.

8. The method as in claims 1, further comprising: setting a quantity of cells that are to be included in the history.

9. An apparatus comprising:
   at least one processor; and
   at least one memory including computer program code, the at least one memory and the computer program code configured to, with the at least one processor, cause the apparatus to perform at least the following:
   determine mobility information representative of a mobility of the apparatus during an idle state and a connected state of the apparatus; and
   send mobility information to a node of a wireless network,
   wherein the mobility information comprises a history at least one first cell visited by the apparatus and information regarding the apparatus staying outside of at least one second cell.

10. An apparatus comprising:
    at least one processor; and
    at least one memory including computer program code, the at least one memory and the computer program code configured to, with the at least one processor, cause the apparatus to perform at least the following:
    determine mobility information representative of a mobility of the apparatus during an idle state and a connected state of the apparatus; and
    send mobility information to a node of a wireless network,
    wherein the mobility information comprises a history of cells visited by the apparatus, and wherein the mobility information includes information representative of a quantity of consecutive state transitions from an idle mode to a connected mode experienced by apparatus in a current cell.

11. An apparatus comprising:
    at least one processor; and
    at least one memory including computer program code, the at least one memory and the computer program code configured to, with the at least one processor, cause the apparatus to perform at least the following:
    determine mobility information representative of a mobility of the apparatus during an idle state and a connected state of the apparatus; and
    send mobility information to a node of a wireless network,
    wherein the mobility information comprises a history of cells visited by the apparatus, and wherein the mobility information includes information representative of a quantity of connection releases by the apparatus in a current cell.

12. An apparatus comprising:
    at least one processor; and
    at least one memory including computer program code, the at least one memory and the computer program code configured to, with the at least one processor, cause the apparatus to perform at least the following:
  determine mobility information representative of a mobility of the apparatus during an idle state and a connected state of the apparatus; and
  send mobility information to a node of a wireless network,
  wherein the mobility information comprises a history of cells visited by the apparatus, and wherein the mobility information includes information representative of a quantity of mobility state transitions occurring in a current cell during a time period.

13. An apparatus comprising:
at least one processor; and
at least one memory including computer program code, the at least one memory and the computer program code configured to, with the at least one processor, cause the apparatus to perform at least the following:
  determine mobility information representative of a mobility of the apparatus during an idle state and a connected state of the apparatus; and
  send mobility information to a node of a wireless network,
  wherein the mobility information comprises a history of cells visited by the apparatus, and wherein the mobility information includes information representative of a count of state transitions in a plurality of cells.

14. The apparatus as in claim 9, wherein the history includes time of staying in the at least one first cell.

15. The apparatus as in claim 9, wherein the history includes cell identifiers of the at least one first cell.

16. The apparatus as in claim 15, wherein the cell identifiers of the at least one first cell are in the form of physical cell identifier or cell global identifier.

17. The apparatus as in claim 9, wherein the at least one memory and the computer program code are further configured, with the at least one processor, to cause the apparatus at least to set a quantity of cells that are to be included in the history.

18. A non-transitory computer-readable storage medium including code, which when executed by at least one processor provides operations comprising:
  determining, by a user equipment, mobility information representative of a mobility of the user equipment during an idle state and a connected state of the user equipment; and
  sending, by the user equipment, mobility information to a node of a wireless network, wherein the mobility information comprises a history of at least one first cell visited by the user equipment and information regarding the user equipment staying outside of at least one second cell.

19. A method comprising:
  determining mobility information representative of a mobility of a user equipment during an idle state and a connected state of the user equipment; and
  sending the mobility information to a node of a wireless network, wherein the mobility information comprises a history of one or more cells visited by the user equipment, and wherein the mobility information includes information representative of a quantity of mobility state transitions occurring in a current cell during a time period.

20. A method comprising:
  determining mobility information representative of a mobility of a user equipment during an idle state and a connected state of the user equipment; and
  sending the mobility information to a node of a wireless network, wherein the mobility information comprises a history of one or more cells visited by the user equipment, wherein the mobility information includes information representative of a quantity of mobility state transitions occurring in a current cell during a time period, and wherein the mobility information includes information representative of a count of state transitions in a plurality of cells.

* * * * *

UNITED STATES PATENT AND TRADEMARK OFFICE
CERTIFICATE OF CORRECTION

| | | |
|---|---|---|
| PATENT NO. | : 9,549,352 B2 | Page 1 of 1 |
| APPLICATION NO. | : 14/396167 | |
| DATED | : January 17, 2017 | |
| INVENTOR(S) | : Woonhee Hwang et al. | |

It is certified that error appears in the above-identified patent and that said Letters Patent is hereby corrected as shown below:

In the Claims

Column 10, Claim 6, Line 9, insert:
--The method as in claim 1, wherein the history includes--

Column 10, Claim 6, Line 10, insert:
--cell identifier of the at least one first cell.--

Column 10, Claim 7, Line 11, insert:
--The method as in claim 1, wherein the cell identifier--

Column 10, Claim 7, Line 12, insert:
--of the at least one first cell is in the form of physical cell--

Column 11, Claim 15, Line 31, insert:
--includes cell identifier of the at least one first cell.--

Column 11, Claim 16, Line 33, insert:
--tifier of the at least one first cell is in the form of physical--

Signed and Sealed this
Twentieth Day of February, 2018

Andrei Iancu
*Director of the United States Patent and Trademark Office*